US009346905B2

(12) United States Patent
Cavallin

(10) Patent No.: US 9,346,905 B2
(45) Date of Patent: May 24, 2016

(54) LOW VISCOSITY HIGH SOLIDS COPOLYMER

(71) Applicant: Valspar Sourcing, Inc., Minneapolis, MN (US)

(72) Inventor: Carl Lewis Cavallin, Albertville, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 14/575,576

(22) Filed: Dec. 18, 2014

(65) Prior Publication Data

US 2015/0105528 A1    Apr. 16, 2015

Related U.S. Application Data

(62) Division of application No. 13/386,810, filed as application No. PCT/US2010/038091 on Jun. 10, 2010, now Pat. No. 8,940,847.

(60) Provisional application No. 61/185,942, filed on Jun. 10, 2009.

(51) Int. Cl.
| C08F 220/28 | (2006.01) |
| C08F 212/12 | (2006.01) |
| C08F 220/18 | (2006.01) |
| C08F 222/06 | (2006.01) |
| C09D 125/16 | (2006.01) |
| C08F 212/08 | (2006.01) |

(52) U.S. Cl.
CPC ............. *C08F 220/28* (2013.01); *C08F 212/12* (2013.01); *C08F 220/18* (2013.01); *C08F 222/06* (2013.01); *C09D 125/16* (2013.01); *C08F 212/08* (2013.01); *C08F 2220/281* (2013.01)

(58) Field of Classification Search
CPC .... C08F 220/28; C08F 220/18; C08F 222/06; C08F 222/281; C08F 212/12; C08F 212/08; C08F 2220/281; C09D 125/16
USPC .......................................... 526/320; 525/303
See application file for complete search history.

(56) References Cited

U.S. PATENT DOCUMENTS

| 4,049,608 A | 9/1977 | Steckler et al. |
| 4,137,389 A | 1/1979 | Wingler et al. |
| 4,414,370 A | 11/1983 | Hamielec et al. |
| 4,529,787 A | 7/1985 | Schmidt et al. |
| 4,546,160 A | 10/1985 | Brand et al. |
| 4,743,657 A | 5/1988 | Rekers et al. |
| 5,162,406 A | 11/1992 | Meyer et al. |
| 5,229,458 A | 7/1993 | Schimmel |
| 5,698,617 A | 12/1997 | Marzola et al. |
| 8,013,081 B2 | 9/2011 | Heuts et al. |
| 2004/0266953 A1 | 12/2004 | Charmot et al. |

OTHER PUBLICATIONS

McManus et al. "Copolymerization of alpha-methyl styrene with butyl acrylate in bulk", Polymer, 43 (2002), pp. 1607-1614.*
McManus et al. "Free radical terpolymerization of butyl acrylate/methyl methacrylate and alpha methyl styrene at high temperature", Polymer, 45 (2004), pp. 5837-5845.*
Joncryl 500 Polyol, Technical Brochure, BASF, 10 pages (Oct. 1, 2008).
McManus, N.T. et al., "Copolymerization of alpha-methyl styrene with butyl acrylate in bulk", Polymer 43, pp. 1607-1614 (2002).
Martinet, F. et al., "Copolymerization with Depropagation: Experiments and Prediction of Kinetics and Properties of α-Methylstyrene/Methyl Methacrylate Copolymers. I. Solution Copolymerization", Journal of Applied Polymer Science, vol. 65, pp. 2297-2313 (1997).
Martinet, F. et al., "Copolymerization with Depropagation: Prediction of Kinetics and Properties of α-Methylstyrene-Methyl Methacrylate Copolymers. II. Bulk Copolymerization", Journal of Applied Polymer Science, vol. 72, pp. 1611-1625 (1999).
Martinet, F. et al., "Copolymerization of α-Methylstyrene with Methyl Methacrylate. III. Emulsion Process: Experimental Data on Kinetics, Particle Size, Composition, Molecular Weight, and Glass Transition Temperature", Journal of Applied Polymer Science, vol. 72, pp. 1627-1643 (1999).
Fleischauer J. et al., "Untersuchungen zum Reaktionsverhalten beim Vorliegen von Depolymerisationsreaktionen", Die Angewandte Makromolekulare Chemie 243, pp. 11-37, Nr. 4117 (1996).
O'Driscoll, K.F. et al., Copolymerization with Depropagation. II. Rate of Copolymerization of Styrene-α-Methylstyrene, J. Macromol Sci.-Chem., A2(3), pp. 449-457 (May 1968).
Fischer, J.P., "Kinetik der radikalischen Copolymerisation α-substituierter Styrole mit Styrol", Die Makromolekulare Chemie 155, pp. 211-225 (1972).
Fischer, J.P. et al., "Kinetik der radikalischen Copolymerisation α-substituierter Styrole mit Styrol", Die Makromolekulare Chemie 155, pp. 239-257 (1972).
Rudin, A. et al., "Monomer Chain-Transfer Constants from Emulsion Copolymerization Data: Styrene and α-Methylstyrene", Journal of Polymer Science, Polymer Chemistry Edition, vol. 17, pp. 493-502 (1979).
Branston, R. et al., "Emulsion Copolymers of α-Methylstyrene and Styrene", Journal of Applied Polymer Science, vol. 40, pp. 1149-1162 (1990).
Barson, C.A. et al., "Kinetic Studies of the Copolymerisation of Styrene and α-Methylstyrene", Eur. Polym. J., vol. 22, No. 3, pp. 195-197 (1986).
Pazhanisamy P., et al., "Copolymers of α-Methylstyrene with N-Cyclohexylacrylamide: Synthesis, Monomer Reactivity Ratios, and Mean Sequence Length", Journal of Macromolecular Science, Part A: Pure and Applied Chemistry, 34(6), pp. 1045-1054 (1997).

(Continued)

*Primary Examiner* — Michael M Bernshteyn
(74) *Attorney, Agent, or Firm* — IPLM Group, P.A.

(57) ABSTRACT

A reaction mixture containing a copolymer having a number average molecular weight less than about 4,000 amu and a polydispersity less than about 3 formed in the presence of a free radical initiator and a heated liquid reaction mixture fed with one or more added olefinic monomers, the reaction mixture otherwise consisting essentially of non-homopolymerizable olefinic monomer.

20 Claims, No Drawings

(56) References Cited

OTHER PUBLICATIONS

McManus et al., "Free radical terpolymerization of butyl acrylate/methyl methacrylate and alpha methyl styrene at high temperature", Polymer, 45, pp. 5837-5845 (2004).

Sharma, K.R., "Thermal terpolymerization of alphamethylstyrene, acrylonitrile and styrene", Polymer 41, pp. 1305-1308, (2000).

Weiss, Keith D., "Paint and Coatings: A Mature Industry in Transition", Prog. Polym. Sci., vol. 22, pp. 203-245, (1997).

Organic Peroxides Product Bulletin, Peroxide Selection Guide for Molding Unsaturated Polyester Resins at *Elevated Temperatures*, ARKEMA, 6 pages (2000).

* cited by examiner

LOW VISCOSITY HIGH SOLIDS COPOLYMER

CROSS-REFERENCE TO RELATED APPLICATION

This application is a divisional of U.S. application Ser. No. 13/386,810 filed Jan. 24, 2012, now U.S. Pat. No. 8,940,847 B2, which is a national stage filing under 35 U.S.C. §371 of International Application No. PCT/US2010/038091 filed Jun. 10, 2010, which claims priority under 35 U.S.C. §119 to U.S. Provisional Application Ser. No. 61/185,942 filed Jun. 10, 2009. The disclosure of each of these applications is incorporated herein by reference.

FIELD

This invention relates to copolymers and to methods for making the same.

BACKGROUND

High solids content solvent-borne coating compositions based on urethanes or on melamine-crosslinked resins have been used for demanding end-use applications such as coatings on farm implements and construction equipment. Especially durable coatings may be made by including in the coating composition a substantial proportion of a low molecular weight, low polydispersity acrylic polyol. A class of such acrylic polyols is sold under the JONCRYL™ name by BASF Performance Chemicals. They are believed to be made in a pressurized reactor system using a so-called "solid grade oligomer" process according to one or more of U.S. Pat. Nos. 4,414,370, 4,529,787 and 4,546,160.

When making polymers, the polymerization process may be limited by a number of factors including the reaction mixture viscosity and the viscosity buildup rate during polymerization. This can be a particular concern when making high solids, low solvent content polymers, as it may be difficult to stir the polymer adequately. The reaction mixture viscosity can be lowered and stirring can be facilitated by carrying out polymerization in a high boiling point solvent. However, high boiling point solvents also tend to have slow evaporation rates and may be difficult to remove by vacuum stripping. These and other obstacles have made it difficult to form copolymers having low molecular weight and low polydispersity, especially when it is desired to avoid the high capital expense associated with the use of a pressurized reactor system.

SUMMARY OF INVENTION

The present invention provides in one aspect a process for making a copolymer, which process comprises:
a) providing a reaction vessel containing a non-homopolymerizable olefinic monomer (hereafter, the "starter monomer") heated to a temperature of at least 100° C.; and
b) feeding one or more added olefinic monomers into the starter monomer in the presence of a free radical initiator to form a copolymer of the added olefinic and starter monomers.

The recited process may be performed in a batch, semi-continuous or continuous fashion, and is especially well suited to low cost batch or semi-continuous processing using an unpressurized reactor. In preferred embodiments of the disclosed process, the reaction vessel contents in step a) consist essentially of or consist of the starter monomer; the process is performed with little or no added solvent; the process forms an acrylic copolymer (e.g., an acrylic polyol); or the process forms a copolymer whose number average molecular weight is less than about 4,000 amu and whose polydispersity is less than about 3.

The invention provides in another aspect a reaction mixture containing a copolymer having a number average molecular weight less than about 4,000 amu and a polydispersity less than about 3 formed in the presence of a free radical initiator and a heated liquid reaction mixture fed with one or more added olefinic monomers, the reaction mixture otherwise consisting essentially of non-homopolymerizable olefinic monomer.

Without intending to be bound by theory, the starter monomer may function as a reactive diluent in which the polymerization reaction may be performed without an early increase in viscosity as polymerization proceeds. Carrying out polymerization in the starter monomer permits the reaction to be commenced at a high initial reaction temperature (for example, at about 160-165° C. for a reaction carried out in alpha-methylstyrene), and enables the reaction temperature to be increased to even higher levels as the starter monomer is consumed (for example, to about 200-220° C. for a reaction carried out in alpha-methylstyrene). When polymerization is completed, the copolymer may be left in neat form, cut in a desired solvent, dissolved in water (e.g., in an aqueous alkaline solution capable of solubilizing acid groups in an acrylic copolymer) or reacted with one or more suitable additional reactants (e.g., with an oxirane-containing monomer capable of reacting with acid groups in an acrylic copolymer).

DETAILED DESCRIPTION

The following detailed description describes certain embodiments and is not to be taken in a limiting sense. All weights, amounts and ratios herein are by weight, unless otherwise specifically noted. The terms shown below have the following meanings:

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, a coating composition that contains "an" additive means that the coating composition includes "one or more" additives.

The term "acrylic monomers" includes monomers containing or derivable from acrylic or methacrylic acid.

The term "boiling point" when used with respect to a liquid material in a reaction vessel refers to the temperature at which the liquid boils or sublimes under the pressure conditions in the reactor vessel. For an unpressurized reaction vessel the pressure condition will be the ambient atmospheric pressure. For a pressurized reaction vessel the pressure condition and the boiling point may both have greater absolute values than is the case in an unpressurized reactor.

The term "gloss" when used with respect to a coating composition means the 60° measurement obtained when evaluating the coating according to ASTM D 523-08.

The term "(meth)acrylic acid" includes either or both of acrylic acid and methacrylic acid, and the term "(meth)acrylate" includes either or both of an acrylate and a methacrylate. Similar usage is employed for other derivatives of acrylic acid and methacrylic acid, e.g., (meth)acrylamide, (meth)acrolein and so on.

The term "non-homopolymerizable" when used in respect to an olefinic monomer means that a neat solution of the monomer may be held at a temperature of at least 100° C. for several hours (e.g., for at least two hours) without forming increasing quantities of homopolymer. This does not mean that a homopolymer never forms or would not do so at a lower temperature; for example alpha-methylstyrene can form a homopolymer at temperatures below about 60° C., but above about 60° C. the homopolymer depolymerizes at a rate greater than the rate of homopolymer formation and an increasing quantity of homopolymer is not observed.

The term "non-copolymerizable" when used in respect to a heated quantity of two or more olefinic monomers means that the monomers may be held at a temperature of at least 100° C. for several hours (e.g., for at least two hours) without forming increasing quantities of copolymer. This does not mean that a copolymer never forms or would not do so at a lower temperature, and instead merely means that when so held an increasing quantity of copolymer is not observed.

The term "olefinic monomers" means monomers containing ethylenic unsaturation including (meth)acrylates, vinyls, vinyl ethers, alkenes, and the like.

The term "polydispersity" when used in respect to a polymer means the ratio of the polymer number average molecular weight (Mn) to the weight average molecular weight (Mw) as determined using gel permeation chromatography, a WATERS™ No. 515 HPLC pump, No. 717 Plus HPLC Autosampler and No. 2410 Refractive Index Detector (all from Waters Corporation), a 25 cm×10 mm JORDI GEL™ DVB 1000 Angstrom column and 50 cm×10 mm JORDI GEL DVB Mixed Bed Column (both from Jordi Labs, LLC) and EASICAL™ PS-1 580-7,500,000 molecular weight polystyrene standards (from Varian, Inc.).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

A variety of reaction vessels may be used in the disclosed process. Exemplary reaction vessels include tank reactors (e.g., continuous stirred tank reactors), tube reactors and extruders. The reaction vessel may be equipped with any desired means for temperature control, including control using a cooling jacket, internal cooling coils or by withdrawal of vaporized monomer followed by condensation thereof and return of the condensed monomer to the reaction vessel. The reaction vessel may if desired be a single large vessel or a plurality of vessels operated in series or in parallel. The reaction vessel preferably includes a stirring device, e.g., one or more vaned agitators driven by a motor or other external power source. The reaction vessel may be provided with additional features for improved efficiency or safety, such as measuring devices, instrument probes, sampling ports, solvent recovery capability, additional cooling devices for preventing "run-away" polymerization, vacuum ports, or seals and other fittings to permit pressurized operation.

A variety of starter monomers may be used in the disclosed process. The disclosed reaction vessel desirably initially contains only a single starter monomer, although minor amounts of other starter monomers or even minor amounts of homopolymerizable olefinic monomers may be employed if the resulting mixture is non-copolymerizable when heated to the temperature at which the added olefinic monomer feed will commence. Expressed on a numeric basis, the starter monomer desirably homopolymerizes at a rate less than about 10%, preferably less than about 5%, and more preferably less than about 1% of the rate at which styrene homopolymerizes under standard conditions for free-radically initiated emulsion polymerization.

Exemplary starter monomers include monomers having the formula:
and anhydrides thereof, wherein each X moiety may independently be hydrogen, halogen, or an organic group and at least two X moieties are selected from $R^1$, $COOR^2$, and Ar, wherein $R^1$ is an organic group; $R^2$ is hydrogen, halogen, or an organic group (preferably a $C_1$-$C_{10}$ alkyl group); and Ar is an aromatic group, e.g., a phenyl group of the chemical formula $C_6(R^3)_5$ where $R^3$ is independently hydrogen, a halogen, or an organic group and two $R^3$ groups can join to form a ring optionally containing one or more heteroatoms. Exemplary such monomers include fumaric acid (B.P. 165° C., sublimes), maleic acid (B.P. 137-140° C.) and maleic anhydride (B.P. 200° C.); monomers having the chemical structure $C(Ar)(R^1)$=$CH_2$ where Ar and $R^1$ are as defined above (e.g., alpha-methylstyrene (B.P. 164-168° C.), trans-beta-methylstyrene (B.P. 175° C.), and alpha-ethylstyrene); monomers having the chemical structure $R^1O(O)C$—CH=CH—$C(O)OR^2$ where $R^1$ and $R^2$ are as defined above (e.g., diethyl fumarate (B.P. 218-219° C.) and diethyl maleate (B.P. 225° C.)); monomers having the chemical structure Ar—CH=CH—Ar where Ar is as defined above (e.g., cis-stilbene (B.P. 145° C. at 13 mm Hg) and trans-stilbene (B.P. 305-307° C.)); and combinations thereof. The starter monomer may for example represent about 10 to about 40 wt. %, about 10 to about 30 wt. % or about 10 to about 25 wt. % of the total copolymer weight.

A variety of added olefinic monomers may be employed in the disclosed process. At least one of the added olefinic monomers is different from the starter monomer. The added olefinic monomers may for example all be homopolymerizable olefinic monomers. Exemplary added olefinic monomers include styrene, vinyl toluene, tertiary butyl styrene, ortho-chlorostyrene, vinyl acetate, vinyl esters of versatic acid (e.g., VEOVA™ 10 from Hexion Specialty Chemicals) and a wide variety of acrylic monomers including acrylic or methacrylic acid, esters of acrylic or methacrylic acid and derivatives and mixtures thereof. Exemplary acrylic monomers include methyl (meth)acrylate, ethyl (meth)acrylate, n-propyl (meth)acrylate, n-butyl (meth)acrylate, isopropyl (meth)acrylate, isobutyl (meth)acrylate, n-amyl (meth)acrylate, n-hexyl (meth)acrylate, isoamyl (meth)acrylate, 2-hydroxyethyl (meth)acrylate, 2-hydroxypropyl (meth)acrylate, N,N-dimethylaminoethyl (meth)acrylate, N,N-diethylaminoethyl (meth)acrylate, t-butylaminoethyl (meth)acrylate, 2-sulfoethyl (meth)acrylate, trifluoroethyl (meth)acrylate, glycidyl (meth)acrylate, benzyl (meth)acrylate, allyl (meth)acrylate, 2-n-butoxyethyl (meth)acrylate, 2-chloroethyl (meth)acrylate, sec-butyl-(meth)acrylate, tert-butyl (meth)acrylate, 2-ethylbutyl (meth)acrylate, cinnamyl (meth)acrylate, crotyl (meth)acrylate, cyclohexyl (meth)acrylate, cyclopentyl (meth)acrylate, 2-ethoxyethyl (meth)acrylate, furfuryl (meth)acrylate, hexafluoroisopropyl (meth)acrylate, methallyl (meth)acrylate, 3-methoxybutyl (meth)acrylate, 2-methoxybutyl (meth)acrylate, 2-nitro-2-methylpropyl (meth)acrylate, n-octyl(meth)acrylate, 2-ethylhexyl (meth)acrylate, 2-phenoxyethyl (meth)acrylate, 2-phenylethyl (meth)acrylate, phenyl (meth)acrylate, propargyl (meth)acrylate, tetrahydrofurfuryl (meth)acrylate, tetrahydropyranyl (meth)acrylate, acetoacetoxyethyl (meth)acrylate and mixtures thereof. Other exemplary derivatives include (meth)acrylic acid salts, (meth)acrylonitrile, (meth)acrylamide, N-methyl (meth)acrylamide, N-ethyl(meth)acrylamide, N,N-diethyl (meth)acrylamide, N,N-dimethyl(meth)acrylamide, N-phenyl(meth)acrylamide, (meth)acrolein, methyl alpha-chloroacrylate, methyl 2-cyanoacrylate and mixtures thereof. Especially preferred added olefinic monomers include styrene, vinyl toluene, vinyl acetate, (meth)acrylic acid, methyl (meth)acrylate, ethyl (meth)acrylate, butyl (meth)acrylate, 2-ethylhexyl (meth)acrylate, hydroxyethyl (meth)acrylate, hydroxybutyl (meth)acrylate, hydroxypropyl (meth)acrylate, glycidyl (meth)acrylate, 4-hydroxybutyl (meth)acrylate glycidylether, 2-(acetoacetoxy)ethyl methacrylate, diacetone acrylamide, methylol (meth)acrylamide, acrylonitrile, allyl methacrylate, and mixtures thereof. Mixtures of acrylic and non-acrylic monomers are also preferred. For example, mixtures of added olefinic monomers (including mixtures of acrylic monomers, mixtures of non-acrylic monomers, and mixtures of acrylic and non-acrylic monomers) may be used to adjust the glass transition temperature (Tg) of the completed copolymer by altering the relative amounts of "hard" (higher Tg) and "soft" (lower Tg) monomers. The added olefinic monomer(s) may for example represent about 60 to about 90 wt. %, about 70 to about 90 wt. % or about 75 to about 90 wt. % of the total copolymer weight.

The added olefinic monomer feed may include monomers with an excess of acidic or amino groups in order to provide a product copolymer that will be water soluble or water dispersible. The added olefinic monomer feed may also or instead include one or more monomers having reactive groups (e.g., cross-linkable or other functional groups such as hydroxy, carboxyl, amino, isocyanate, glycidyl, epoxy, allyl, and like groups), as such groups may directly or indirectly (e.g., by post-reaction of acid or other groups in the acrylic polymer) introduce a desired further functionality into the copolymer. For example, a functionalized copolymer may be formed from a monomer feed that includes a monomer having both vinyl and oxirane functionality. The vinyl functionality may be utilized to incorporate the monomer into the copolymer backbone and the oxirane functionality may be utilized in a post-reaction with an unsaturated acid such as acrylic acid or methacrylic acid to impart reactive unsaturation into the copolymer via epoxy esterification. Copolymers containing such reactive unsaturation may for example be used together with a suitable photoinitiator to make light-curable (e.g., UV-curable) coating compositions. Exemplary monomers containing both vinyl and oxirane functionality include glycidyl methacrylate, glycidyl acrylate, and allyl glycidyl ether. As a further example, a functionalized acrylic copolymer may be formed from a monomer feed that includes a vinyl functional acid such as acrylic acid or methacrylic acid to impart acidic functionality into the acrylic copolymer backbone and the acidic functionality may be utilized in a post-reaction with an epoxy functional vinyl monomer to impart reactive unsaturation into the acrylic copolymer via epoxy esterification. Exemplary epoxy functional vinyl monomers include glycidyl (meth)acrylate and allyl glycidyl ether. Persons having ordinary skill in the art will appreciate from this description that other monomers may be similarly employed. For example, acrylic copolymers functionalized with condensable cross linkable groups may be formed using a variety of monomers including t-butylaminoethyl (meth)acrylate, isopropylidene glyceryl (meth)acrylate and oxazolidinylethyl (meth)acrylate.

Hydroxyl-containing acrylic monomers are preferred for making acrylic polyols. Exemplary such monomers include hydroxyl alkyl (meth)acrylates and hydroxyesters of glycidyl (meth)acrylates, including 2-hydroxymethyl (meth)acrylate, 2-hydroxyethyl (meth)acrylate, 2-hydroxypropyl (meth) acrylate, 3-chloro-2-hydroxypropyl (meth)acrylate, 2-hydroxy-butyl (meth)acrylate, 6-hydroxyhexyl (meth)acrylate, 5,6-dihydroxyhexyl methacrylate and the like. Hydroxyl functionality may also be introduced into the disclosed copolymers via post-reaction, e.g., via esterification or transesterification techniques like those described above.

Before the added olefinic monomer(s) are fed into the starter monomer, the starter monomer desirably is heated to a sufficiently high temperature to enable an efficient and complete polymerization reaction once the monomer feed begins. This temperature may for example be within about 40° C., within about 20° C., within about 10° C. or within about 5° C. below the starter monomer boiling point. Desirably however the temperature is such that the starter monomer remains in liquid form and does not undergo undue boiling. For high-boiling starter monomers (e.g., trans-stilbene), somewhat lower temperatures may be preferred, e.g., a temperature within about 120° C. or within about 100° C. below the starter monomer boiling point. With these caveats in mind, and depending on the chosen starter monomer and reaction vessel, the starter monomer desirably is heated to a temperature of about 100 to about 300° C., about 140 to about 270° C. or about 160 to about 240° C. The reaction mixture temperature desirably is maintained at or above the starting temperature by controlling the added olefinic monomer feed rate, by adding additional heat or by cooling the reaction vessel contents. The reaction mixture temperature also desirably is raised (e.g., by at least another 10° C., at least another 20° C. or at least another 30° C.) during the course of the reaction as the starter monomer is consumed by formation of the copolymer. The added olefinic monomer(s) desirably are fed at a rate sufficient to promote rapid formation of the desired copolymer without causing the reaction mixture to overheat or otherwise run out of control. The chosen feed rate will depend on a number of factors and will generally be determined empirically. As a starting point for a batch process, the feed rate may for example be adjusted so that the entire monomer addition takes place over the course of several hours and the reaction and cleanup are completed before the end of an eight hour production shift.

The free radical initiator may be added along with the added olefinic monomer feed or may be present in or added to the reaction vessel before starting the added olefinic monomer feed. A variety of initiators may be employed, including aliphatic azo compounds such as 1-t-amylazo-1-cyanocyclohexane, azo-bis-isobutyronitrile and 1-t-butylazo-cyanocyclohexane, and peroxides or hydroperoxides such as t-butylperoctoate, t-butyl perbenzoate, dicumyl peroxide, di-t-butyl peroxide, t-butyl hydroperoxide and cumene hydroperoxide and the like. The initiator amount may be selected based on a variety of considerations including the targeted copolymer yield, chosen reaction temperature and reaction time, and desired molecular weight, polydispersity, purity and coloration, and will generally be determined empirically.

The reaction may if desired be carried out in the presence of one or more suitable solvents. When employed, a solvent may be added to the reaction vessel before starting the added olefinic monomer feed, may be added together with the added olefinic monomer feed or may be added to the reaction vessel as a separate feed. The selection of a particular solvent and its level of addition may be based on a variety of factors including the chosen monomers, the desired end use for the copolymer and the available reaction vessel or vacuum stripping equipment. In general, it is preferred to use as little solvent as possible to reduce separation and recovery requirements and minimize the formation of undesired oligomers (e.g., dimers or trimers) and contaminants (e.g., chomophores). Solvents may however permit a lower reaction temperature to be employed (e.g., by acting as a heat sink to prevent run-away reactions and reduce cooling requirements), may reduce stirrer torque, may provide a less viscous or more plasticized final product, or may reduce the product acid number or molecular weight. Higher boiling solvents are preferred due to their low vapor pressure at high temperatures, e.g., solvents with a boiling point above 100° C. or above 150° C. Exemplary such solvents include alkanes such as heptane (B.P. 98° C.), octane (B.P. 126° C.), mineral spirits (B.P. 140-300° C.) and mixtures thereof; aromatic hydrocarbons including toluene (B.P. 110° C.), xylene (B.P. 140° C.), ligroin (B.P. 60-90° C.), commercially-available materials such as the "AROMATIC" series fluids (e.g., AROMATIC 150 and AROMATIC 200) from ExxonMobil Corp. and the SHELLSOL™ series fluids (e.g., SHELLSOL A100 and SHELLSOL A150) from Shell Chemical Co, and mixtures thereof; petroleum solvents including petroleum naphtha, VM&P naphtha, Stoddard solvent, kerosene (B.P. 150° C.) and mixtures thereof, plant-derived solvents including turpentine (B.P. 150-180° C.); ketones including methyl ethyl ketone (B.P. 80° C.), methyl isobutyl ketone (B.P. 117° C.), methyl isoamyl ketone (B.P. 144° C.), methyl amyl ketone (B.P. 150° C.), cyclohexanone (B.P. 156° C.), isobutyl ketone (B.P. 168° C.), methyl hexyl ketone (B.P. 173° C.), methyl heptyl ketone (B.P. 192° C.) and mixtures thereof; aromatic alcohols such as benzyl alcohol (B.P. 203-205° C.), toluene alcohols and the like; alcohol and glycol ethers, esters and mixed ethers and esters such as ethylene glycol (B.P. 195° C.), propylene glycol (B.P. 188° C.), 1,3-butylene glycol (B.P. 204° C.), diethylene glycol (B.P. 245° C.), 1,6-hexanediol (B.P. 250° C.), decanol (B.P. 231° C.), the series of CELLOSOLVE™ and CARBITOL™ solvents available from Dow Chemical Company and the series of glyme and diglyme solvents available from Clariant Corporation. The solvent amount may for example be 0 to about 25 wt. % or 0 to about 15 wt. % of the reaction mixture based on the weight of monomers employed.

The reaction may be monitored to attain a variety of target values for the copolymer, for example a target solids level, Mn, Mw, polydispersity index (PDI), viscosity, glass transition temperature (Tg), hydroxyl number or acid number. These targets may vary considerably depending on the desired end use and required performance characteristics. As a general guide, the solids level may for example be at least about 50 wt. %, at least about 60 wt. % or at least about 70 wt. % based on the total product weight. The Mn may for example be at least about 500, at least about 800 or at least about 1,000 amu, and may for example be less than about 4,000, less than about 2,000 or less than about 1,500 amu. The Mw may for example be at least about 650, at least about 1,000 or at least about 1,300 amu, and may for example be less than about 10,000, less than about 5,000 or less than about 4,000 amu. The PDI may for example be less than about 3, less than about 2.5 or less than about 2. The copolymer viscosity may for example be less than about 15,000, less than about 10,000 or less than about 6,000 centipoise when an 80 wt. % solution of the copolymer in n-butyl acetate is evaluated at 25° C. using a BROOKFIELD™ Model DVI+ viscometer with an S33 spindle operated at 5 rpm. The Tg may for example be at least about −40° C., at least about −20° C. or at least about 0° C., and may for example be less than about 150° C., less than about 100° C. or less than about 50° C. The hydroxyl number may for example be 0 to about 250, about 50 to about 200 or about 75 to about 150, and the acid number may for example be 0 to about 250, 0 to about 150 or 0 to about 80.

The disclosed copolymers may be used in a variety of applications including solvent-borne or waterborne coatings, thermosetting coatings, single part coatings and multipart coatings employing a crosslinking agent capable of reacting with appropriate functionality in the copolymer. The coating compositions may include a variety of adjuvants including anti-cratering agents, biocides, coalescents, colorants, crosslinkers, curing indicators, defoamers, dyes, fillers, flatting agents, flow control agents, fungicides, heat stabilizers, leveling agents, mar and abrasion additives, pigments, plasticizers, rheology control agents, sedimentation inhibitors, solvents, surface active agents, thickeners, ultraviolet-light absorbers, waxes and the like. The disclosed copolymers have particular utility when used with crosslinkers to make high performance coating compositions. Exemplary crosslinkers include polyisocyanates, blocked polyisocyanates, phenolics, melamine formaldehyde resins, urea formaldehyde resins, benzoguanamine formaldehyde resins, glycoluril formaldehyde resins, (meth)acrylamide formaldehyde resins, epoxides, and the like. The coating compositions may contain one or more optional volatile organic compounds (VOCs). Desirably the coating compositions include less than 50 wt. %, more preferably less than 40 wt. %, and most preferably less than 30 wt. % VOCs based upon the total coating composition weight.

The disclosed coating compositions may be applied to a variety of substrates including coils and other forms of sheet metal, cans, fabrics, vinyl and other plastics, paper, metal furniture, wire, metal parts, wood, wood veneer and the like. The coating compositions may be applied to substrates using any suitable application method. For example, the compositions may be roll coated, sprayed, curtain coated, vacuum coated, brushed, or flood coated using an air knife system. Preferred application methods provide a uniform coating thickness and are cost efficient. Especially preferred application methods employ factory equipment that moves the substrate past a coating head and thence past suitable drying or curing equipment. Exemplary coating end uses include farm implement coatings, construction equipment coatings, auto-, truck- or airplane exterior finishes, appliance coatings, overprint varnishes, inks, adhesives, floor finishes and the like. A recommended thickness for the dried or otherwise hardened coating composition is between about 10 and about 200 micrometers, preferably between about 25 and about 120 micrometers, more preferably between about 30 and about 100 micrometers, and most preferably between about 35 and about 75 micrometers.

The invention is further described in the following Example, in which all parts and percentages are by weight unless otherwise indicated.

EXAMPLE 153.09 parts of alpha-methylstyrene was charged to a reaction vessel and agitated under nitrogen while being heated to 160° C. When the temperature was stable at 160° C., a premix made from 1.03 parts t-butyl peroxybenzoate initiator and 1.88 parts n-butyl acetate was added to the reaction vessel. Immediately following this addition, an added olefinic monomer feed made from a homogenous mixture of 249.23 parts 2-ethylhexyl acrylate, 100.96 parts styrene, 262.17 parts 2-hydroxyethyl methacrylate, 15.52 parts n-butyl acetate, 28.89 parts t-butyl peroxybenzoate and 54.28 parts dicumyl peroxide was introduced into the reaction vessel at a rate sufficient to add all of the feed over the course of about 4.5 hours. At 25 minutes into the feed, the reaction mixture temperature was increased from 160° C. to 180° C. At about 2 hours into the feed, the reaction mixture temperature was increased to 200° C. where it remained for the rest of the feed. After the feed was complete, the batch was held at 200° C. for approximately 20 minutes, then cooled to 154° C. followed by the addition of 101.5 parts n-butyl acetate to the reaction vessel over about five minutes time. About 5 minutes after the addition of the n-butyl acetate was complete, 3.82 parts t-butyl peroxybenzoate was added to the reaction vessel, followed about 10 minutes later by another 3.82 parts t-butyl peroxybenzoate. The temperature was maintained at 145° C. for an additional 35 minutes after which the batch was cooled and removed from the reaction vessel. Using gel permeation chromatography, two different batches of the resulting acrylic copolymer were evaluated and found to have number average molecular weights of 1,080 or 1,000 amu and PDI values of 2.16 or 2.30, respectively.

Having thus described the preferred embodiments of the present invention, those of skill in the art will readily appreciate that the teachings found herein may be applied to yet other embodiments within the scope of the accompanying claims. The complete disclosure of all patents, patent documents, and publications are incorporated herein by reference as if individually incorporated.

I claim:

1. A reaction mixture containing a copolymer having a number average molecular weight less than about 4,000 amu and a polydispersity less than about 3 formed in the presence of a free radical initiator and a heated liquid reaction mixture fed with one or more added olefinic monomers, the reaction mixture otherwise consisting essentially of non-homopolymerizable olefinic monomer.

2. A reaction mixture according to claim 1 wherein the non-homopolymerizable olefinic monomer has the formula:

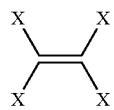

or is an anhydride thereof, wherein each X moiety may independently be hydrogen, halogen, or an organic group and at least two X moieties are selected from $R^1$, $COOR^2$, and Ar, wherein $R^1$ is an organic group; $R^2$ is hydrogen, halogen, or an organic group; and Ar is an aromatic group.

3. A reaction mixture according to claim 1 wherein the non-homopolymerizable olefinic monomer consists essentially of fumaric acid, maleic acid, maleic anhydride, trans-beta-methylstyrene, alpha-ethylstyrene, diethyl fumarate, diethyl maleate, cis-stilbene or trans-stilbene.

4. A reaction mixture according to claim 1 wherein the non-homopolymerizable olefinic monomer consists essentially of alpha-methylstyrene.

5. A reaction mixture according to claim 1 wherein the added olefinic monomer comprises a homopolymerizable (meth)acrylate, vinyl, vinyl ether, alkene or mixture thereof.

6. A reaction mixture according to claim 1 wherein the added olefinic monomer comprises styrene, vinyl toluene, vinyl acetate, (meth)acrylic acid, methyl (meth)acrylate, ethyl (meth)acrylate, butyl (meth)acrylate, 2-ethylhexyl (meth)acrylate, hydroxyethyl (meth)acrylate, hydroxybutyl (meth)acrylate, hydroxypropyl (meth)acrylate, glycidyl (meth)acrylate, 4-hydroxybutyl (meth)acrylate glycidylether, 2-acetoacetoxy)ethyl methacrylate, diacetone acrylamide, methylol (meth)acrylamide, acrylonitrile, allyl methacrylate, or mixture thereof.

7. A reaction mixture according to claim 1 having a solids level of at least about 50 wt. % based on the total copolymer weight.

8. A reaction mixture according to claim 1 having a solids level of at least about 70 wt. % based on the total copolymer weight and little or no added solvent.

9. A reaction mixture according to claim 1 wherein the copolymer is an acrylic copolymer.

10. A reaction mixture according to claim 1 wherein the copolymer is an acrylic polyol.

11. A reaction mixture according to claim 1 wherein the copolymer has a polydispersity less than about 2.5.

12. A reaction mixture according to claim 1 wherein an added olefinic monomer imparts reactive unsaturation into the copolymer.

13. A reaction mixture according to claim 1 wherein the non-homopolymerizable olefinic monomer serves as a reactive diluent in which the copolymer is formed without an early increase in viscosity as copolymerization proceeds.

14. A reaction mixture according to claim 1 wherein the reaction mixture is at a temperature of at least about 140° C.

15. A reaction mixture according to claim 1 wherein the non-homopolymerizable olefinic monomer comprises alpha-methylstyrene and the reaction mixture is at a temperature of at least about 160° C.

16. A reaction mixture according to claim 1 wherein the non-homopolymerizable olefinic monomer represents about 10 to about 40 wt. % of the total copolymer weight and the one or more added olefinic monomers represent about 60 to about 90 wt. % of the total copolymer weight.

17. A reaction mixture according to claim 1 wherein the copolymer is water soluble or water dispersible.

18. A reaction mixture according to claim 1 wherein the copolymer has reactive oxirane groups.

19. A reaction mixture according to claim 1 wherein the copolymer has reactive acidic groups.

20. A reaction mixture according to claim 1 wherein the copolymer has condensable crosslinkable groups.

* * * * *